United States Patent
Short et al.

(10) Patent No.: US 6,636,894 B1
(45) Date of Patent: Oct. 21, 2003

(54) SYSTEMS AND METHODS FOR REDIRECTING USERS HAVING TRANSPARENT COMPUTER ACCESS TO A NETWORK USING A GATEWAY DEVICE HAVING REDIRECTION CAPABILITY

(75) Inventors: Joel E. Short, Los Angeles, CA (US); Frederic Delley, Redwood City, CA (US); Mark F. Logan, Santa Monica, CA (US); Florence C. I. Pagan, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 0 days.

(21) Appl. No.: 09/458,569

(22) Filed: Dec. 8, 1999

Related U.S. Application Data

(60) Provisional application No. 60/111,497, filed on Dec. 8, 1998.

(51) Int. Cl.[7] .............................................. G06F 15/173
(52) U.S. Cl. ...................................... 709/225; 709/249
(58) Field of Search ................................ 709/225, 226, 709/227, 229, 249; 707/1; 713/200, 201

(56) References Cited

U.S. PATENT DOCUMENTS

| | | | |
|---|---|---|---|
| 5,696,898 A | * 12/1997 | Baker et al. ................. | 713/201 |
| 5,761,683 A | 6/1998 | Logan et al. | |
| 5,845,070 A | * 12/1998 | Ikudome ..................... | 713/201 |
| 5,968,176 A | 10/1999 | Nessett et al. | |
| 5,991,292 A | * 11/1999 | Focsaneanu et al. ........ | 370/352 |
| 6,219,694 B1 | * 4/2001 | Lazaridis et al. ........... | 709/206 |
| 6,317,790 B1 | * 11/2001 | Bowker et al. ............. | 709/225 |
| 6,317,837 B1 | * 11/2001 | Kenworthy ................. | 713/200 |
| 6,393,468 B1 | * 5/2002 | McGee ....................... | 709/218 |
| 6,490,620 B1 | * 12/2002 | Ditmer et al. .............. | 709/224 |

FOREIGN PATENT DOCUMENTS

EP  0848338 A1  6/1998

(List continued on next page.)

OTHER PUBLICATIONS

Cisco; *Single–User Network Access Security TACACS+*; Mar. 30, 1995; 9 pages; Cisco White Paper; XP002124521.

D. Brent Chapman, Elizabeth D. Zwicky; *Building Internet Firewalls*, Nov. 1995; pp. 131–188; O'Reilly; XP002202789.

(List continued on next page.)

*Primary Examiner*—Mehmet B. Geckil
(74) *Attorney, Agent, or Firm*—Alston & Bird LLP

(57) ABSTRACT

Systems and methods for dynamically creating new users having transparent computer access to a destination network, wherein the users otherwise have access to a home network through home network settings resident on the users' computers, and wherein the users can access the destination network without altering the home network settings. The system includes a gateway device for receiving a request from a user for access to the destination network, a user profile database comprising stored access information and in communication with the gateway device, and an Authentication, Authorization and Accounting (AAA) server in communication with the gateway device and user profile database. The AAA server determines if user is entitled to access the destination network based upon the access information stored within the user profile database, and wherein the AAA server redirects the user to a login page where the access information does not indicate the user's right to access the destination network. The systems and methods of the present invention can also redirect users having transparent computer access to a destination network, wherein the users otherwise have access to a home network through home network settings resident on the users' computers, and wherein the users can access the destination network without altering the home network settings.

11 Claims, 1 Drawing Sheet

FOREIGN PATENT DOCUMENTS

| | | |
|---|---|---|
| EP | 0889418 A2 | 1/1999 |
| EP | 0 909 073 A2 | 4/1999 |
| EP | 0986230 A2 | 3/2000 |
| WO | WO 96/39668 | 12/1996 |
| WO | WO 98/12643 | 3/1998 |
| WO | WO 99/57865 | 11/1999 |
| WO | WO 99/57866 | 11/1999 |
| WO | WO 99/66400 | 12/1999 |

OTHER PUBLICATIONS

Susan Hinrichs; *Policy–Based Management Bridiging the Gap*; Dec. 6, 1999; pp. 209–218; Computer Security Applications Conference, 1999 (ACSAC 1999), Proceedings, 15$^{th}$ Annual Phoenix, Arizona, USA Dec. 6–10, 1999, Los Alamitos, California, IEEE Comput. Soc.; XP010368586.

* cited by examiner

SYSTEMS AND METHODS FOR REDIRECTING USERS HAVING TRANSPARENT COMPUTER ACCESS TO A NETWORK USING A GATEWAY DEVICE HAVING REDIRECTION CAPABILITY

CROSS-REFERENCE TO RELATED APPLICATIONS

The present application claim priority from U.S. Provisional Patent Application Ser. No. 60/111,497, filed Dec. 8, 1988 the contents of which are incorporated by reference.

FIELD OF THE INVENTION

The present invention relates generally to a gateway device and, more particularly, to a universal network gateway for redirecting to a portal page a computer transparently accessing a service provider network.

BACKGROUND OF THE INVENTION

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy. Importantly, special software must also typically be loaded onto the user's computer to support reconfiguration.

As described by U.S. patent application Ser. No. 08/816,174 and U.S. Provisional Patent Application Nos. 60/111,497, 60/160,973, 60/161,189, 60/161,139, 60/160,890 and 60/161,182, a universal subscriber gateway device has been developed by Nomadix, Inc. of Westlake Village, Calif. The contents of these applications are incorporated herein by reference. The gateway device serves as an interface connecting the user to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the Internet.

The portable computer user, and more specifically the remote or laptop user, benefits from being able to access a myriad of computer networks without having to undergo the time-consuming and all-too-often daunting task of reconfiguring their host computer in accordance with network specific configurations. In addition, no additional software need be loaded onto the computer prior to connection to the other network. From another perspective, the network service provider benefits from avoiding "on-site" visits and/or technical support calls from the user who is unable to properly re-configure the portable computer. In this fashion, the gateway device is capable of providing more efficient network access and network maintenance to the user and the network operator.

Gateway devices are typically used to provide network access to the remote portable computer user, such as users in hotels, airports and other location where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise network needs. With the advent of even smaller portable computing devices, such as handhelds, PDAs, and the like, the locations where these users may reside become almost limitless.

Through gateway devices Internet Service Providers (ISPs) or enterprise network (such as a LAN established by an entity such as a hotel) providers can permit a wide variety of users simple and transparent access to their networks and to other online services. To take advantage of transparent user access to their computer networks and online services enterprise networks or ISPs should be able to redirect users to portal pages that the enterprise or internet service providers wish the user to access or view. For instance, where users are located at an airport, the enterprise network administrator may wish to direct users to a portal page containing arrival and departure information, or to a portal page having the user's itinerary thereon to provide the user an incentive to access the network. ISPs, for example, may wish users to access the ISPs portal page for up to the date news and weather, information regarding the user's Internet service, and paid advertisements.

Homepage redirection has been accomplished in the prior art. For example, America Online (AOL) users, upon accessing the internet, are directed to an AOL homepage from which the users can select a variety of AOL services, and which includes advertising from various companies. Typically, direction of users to such a page benefits the ISP because advertisers pay money to the ISP each time a user accesses the Internet, as subscribers are a captive audience to advertising. Advertisers pay for such advertising not only because of the captive audience, but because advertisers can tailor advertisements based upon the typical audience accessing the internet. Furthermore, AOL may market its services through its homepage, and its homepage may be attractive to potential subscribers. Directing users to a particular. page may serve an additional function. Users may be directed to a particular page, such as a login page, so that the user may enter login information to be authenticated and authorized access on the network. Furthermore, users may wish to establish their own specialized portal page, such as a page including favorite links, a page linking the user to the user's business, or a page including any other items relevant to the user.

However, such redirection of users to homepages has been traditionally based upon software installed on a user's computer and/or configurations of user computers in communication with a home network. For example, where a user's computer is appropriately configured for access to a home network, the user's computer can be configured to access a particular homepage on that network. This can be the case, for example, in businesses where users computers are configured to access an intranet homepage or an internet page specific to that company and located on the internet.

Therefore, a method and system would be desirable which enables a user transparent access to a computer network employing a gateway device where the computer network can provide access to users and direct the users to portal pages established by the user, network administrator or another entity, where the direction is preferably based upon attributes associated with a user, such as the user's location, identity, computer, or a combination thereof. Furthermore, such redirection should be able to redirect users to a login page when the user does not otherwise have access to online services or networks so that the user may login to be authenticated and authorized access on the network.

SUMMARY OF THE INVENTION

The present invention comprises a method and system for redirecting users to a portal page where users have transparent access to a computer network utilizing a gateway device. The method and system advantageously operates in a manner transparent to the user since the user need not reconfigure their computer and no additional software need be added to the computer for reconfiguration purposes.

According to the invention, users accessing the gateway device are redirected to a portal page. Where stored user profiles permit the users access to the destination network, the users can be forwarded to the destination network or a portal page established by the network, user, or another entity. Otherwise, users are directed to a login page in which the users must input user information so that the users can obtain access to networks and online services. The redirection function according to the present invention can be utilized to direct new or existing users to customized homepages established by the gateway device or individual users.

A method for dynamically creating new users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination network, determining if the user is entitled access to the destination network based upon a user profile corresponding to the user and stored within a user profile database in communication with the gateway device, and redirecting the user to a login page when the user profile does not include rights to access the destination network. Furthermore, the method of the present invention can include the step of forwarding the user to the destination network when the user profile includes rights to access the destination network. The method can also include the step of automatically redirecting the user to a portal page following receipt of a request for access to the destination network prior to determining if the user is entitled access to the destination network According to one aspect of the invention, the method can include the step of establishing a login page on a webserver local to the gateway device prior to redirecting the user to the login page. The method can also include accepting user information at the login page which is thereafter utilized by the gateway device to authorize the user access to the destination network. The user profile database can be updated with the user information.

According to another aspect of the invention, the user may be forwarded from the login page and returned to a portal page or directed to a destination address which can be an Internet destination address. Redirecting the user to a login page can include redirecting a browser located on the user's computer to the login page. Furthermore, redirecting the browser located on the user's computer can include receiving a Hyper-Text Transfer Protocol (HTTP) request for the destination address and responding with an HTTP response corresponding to the login page.

According to another embodiment of the invention, a system for dynamically creating new users having transparent computer access to a destination network is disclosed, wherein the users otherwise have access to a home network through home network settings resident on the users' computers, and wherein the users can access the destination network without altering the home network settings. The system includes a gateway device for receiving a request from a user for access to the destination network, and a user profile database comprising stored access information and in communication with the gateway device. The system further includes an Authentication, Authorization and Accounting (AAA) server in communication with the gateway device and user profile database, where the AAA server determines if a user is entitled to access the destination network based upon the access information stored within the user profile database, and wherein the AAA server redirects the user to a login page where the access information does not indicate the user's right to access the destination network. The system can also direct the user to a portal page upon the user's access to the network, prior to determining the access rights of the user.

According to one aspect of the invention, the login page is maintained local to the gateway device. The user profile database and AAA server can also be located within the gateway device. Furthermore, the user profile database can be located within the AAA server.

According to another embodiment of the invention, the user profile database includes a plurality of user profiles, wherein each respective user profile of the plurality of user profiles contains access information. In addition, each respective user profile may contain historical data relating to the duration of destination network access for use in determining the charges due for the destination network access.

According to another embodiment of the invention, a method for redirecting users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination address, such as an Internet address, and redirecting the user to a portal page, wherein the user computer remains configured for accessing the home network, and wherein no additional configuration software need be installed on the user's computer. Furthermore, redirecting the user to a portal page can comprise redirecting the user to a portal page created by an administrator associated with the portal page, or redirecting the user to a portal page customized by the user.

According to another embodiment of the invention, a system for redirecting users having transparent computer access to a destination network is disclosed, where the users otherwise have access to a home network through home network settings resident on the users' computers, and wherein the users can access the destination network without altering the home network settings. The system includes a gateway device for receiving a request from a user for access to the destination network, and an AAA server in communication with the gateway device, where the AAA server intercepts the request from the user for access to the destination network and redirects the user to a portal page, wherein the user's computer remains configured for accessing the home network, and wherein no additional configuration software need be installed on the user's computer. According to one aspect of the invention, the AAA server is located entirely within the gateway device. The portal page of the system can also be maintained on a server local to the gateway device.

A unique advantage of the transparent redirection of users to a portal page, and, in certain circumstances from the portal page, to a login page where users subscribe for network access is that a user can obtain access to networks or online services without installing any software onto the user's computer. On the contrary, the entire process is completely transparent to the user. As such, the method and apparatus of the present invention facilitates transparent access to destination networks without requiring a user to reconfigure the home network settings resident on the user computer and without having to install reconfiguration software.

The method and system of the various embodiments facilitate transparent access to a destination network. According to one embodiment, the method and system facilitate the addition of new subscribers to the network. According to another embodiment, all users can be redirected to a portal page, which can include advertising, without requiring reconfiguration of the users' computers, or new software to be added on the users' computers.

DETAILED DESCRIPTION OF ONE EMBODIMENT OF THE INVENTION

Figure 1:
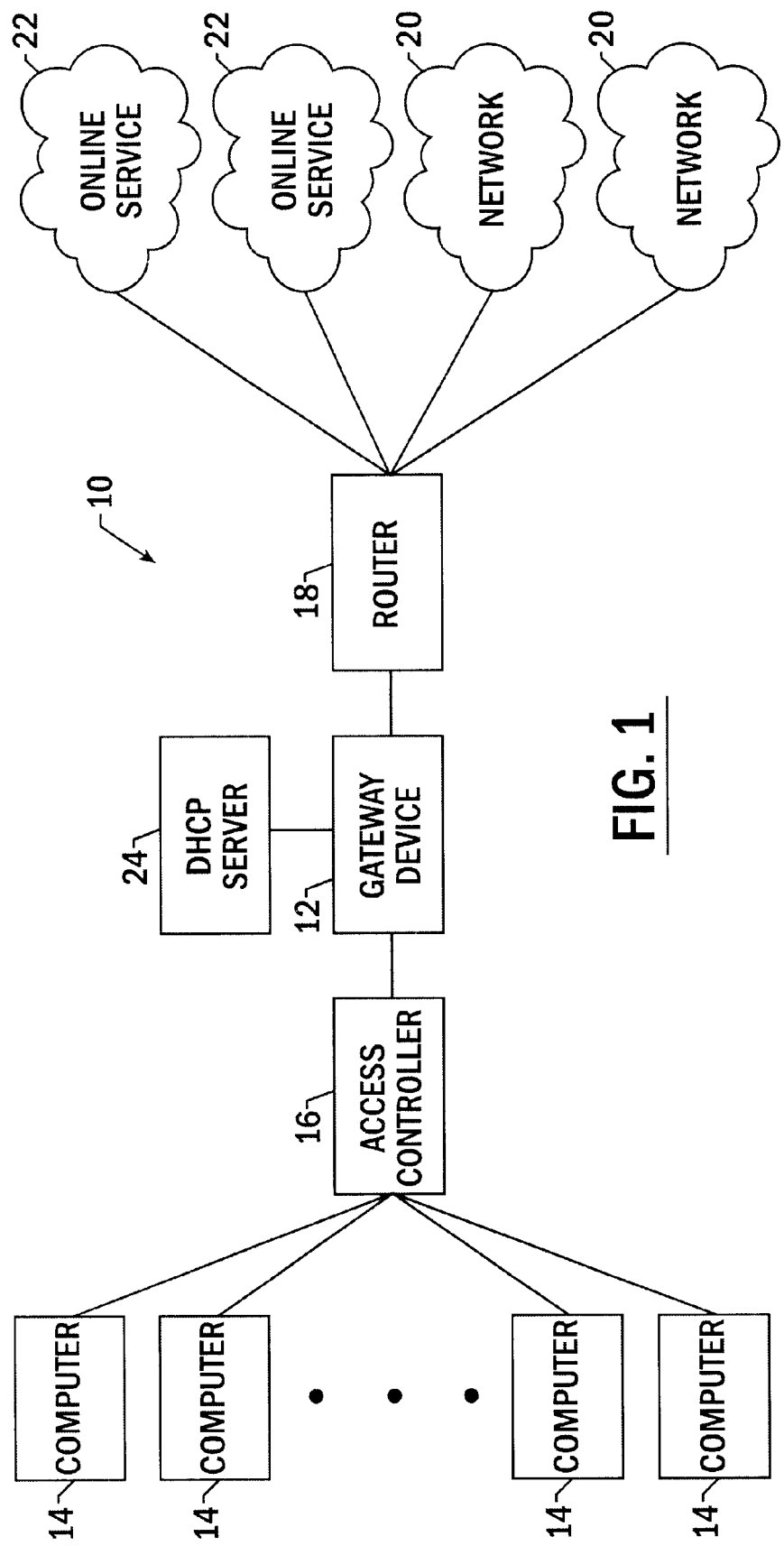
FIG. 1 is a block diagram of a computer system that includes a gateway device for automatically configuring one or more computers to communicate via the gateway device with other networks or other online services, according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher position in the system by being located closer to the various networks 20 or other online services 22, if so desired. For example, the gateway device 12 could be located at a network operating center or could be located before or after a router 18 in the computer network. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately traffic to and from the various networks 20 or online services 22. In this regard, the gateway device 12 typically establishes a link with one or more routers. The routers, in turn, establish links with the servers of other networks or other online service providers, such as internet service providers, based upon the user's selection. It will be appreciated by one of ordinary skill in the art that one or more devices illustrated in FIG. 1 may be combinable. For example, although not shown, the router 18 may be located entirely within the gateway device 12.

The gateway device 12 of the present invention is specifically designed to adapt to the configuration of each of the computers 14 that log onto the computer system 10 in a manner that is transparent to the user and the computer networks 20 or online services 22. In the embodiment shown in FIG. 1, the computer system 10 employs dynamic host configuration protocol (DHCP) service, which is a protocol well known to those of skill in the art and currently implemented in many computer networks. In DHCP networks an IP address is assigned to an individual computer of the plurality of computers 14 when the computer logs onto the computer network through communication with the gateway device 12. The DHCP service can be provided by an external DHCP server 24 or it can be provided by an internal DHCP server located within the gateway device.

In order to allow a user of the computer to communicate transparently with computer networks 20 or online services 22, the gateway device must be able to communicate with the user computer, as well as the various online services 22 or networks 20. In order to support this communication, the gateway device 12 generally performs a packet translation function that is transparent to both the user and the network. In this regard, for outbound traffic from a computer to a network or on-line service, the gateway device 12 changes attributes within the packet coming from the user, such as the source address, checksum, and application specific parameters, to meet the criteria of the network to which the user has accessed. In addition, the outgoing packet includes an attribute that will direct all incoming packets from the accessed network to be routed through the gateway device. In contrast, the inbound traffic from the computer network or other online service that is routed through the gateway device undergoes a translation function at the gateway device so that the packets are properly formatted for the user's host computer. In this manner, the packet translation process that takes place at the gateway device 12 is transparent to the host, which appears to send and receive data directly from the accessed computer network. By implementing the gateway device as an interface between the user and the computer network or other online service, however, the user will eliminate the need to re-configure their computer 12 upon accessing subsequent networks as well as the need to load special configuration software on their computer to support the reconfiguration.

Communication between users and networks or online services may be effectuated through ports, for example, located within hotel rooms or multi-dwelling units, or through conventional dial-up communications, such as through the use of telephone or cable modems. According to one aspect of the invention, users can be are redirected to a portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As discussed below, the user's identification may be used to direct the user to a specific portal page, which can be a particular webpage. As such, the system of the present invention includes means for identifying a user based upon an attribute associated with the user that is contained within the packet transmitted from the user's computer. Attributes can include any data well known in the art for identifying the user, the user's location, and/or the user's computer. In general, identifying a user's computer that accesses a network can be done by a media access control (MAC) associated with the computer. Identifying a computer based upon a MAC address is well known to those of skill in the art, and will not be discussed in detail herein. Additionally, the attribute can be based upon a user name, ID, or according to one advantageous embodiment described below, a particular location, such as from a communications port in a hotel room. As such, the location of the user can be the identifiable attribute.

According to one embodiment of the present invention, after a user accesses the computer network using a computer in communication with the gateway device 12, as described above, the user is directed to a portal page. The portal page may be maintained by an ISP or an enterprise network, or by any entry maintaining a webpage on the Internet. According to one aspect of the invention, the portal page can be a webpage containing any information whatsoever, and can be created by the ISP, enterprise network administrator or user. The portal page can contain information specific to the user accessing the network, as discussed in detail below.

Regardless of whether a user accessing the computer network is authorized access to the network, the user is redirected to a portal page. After being redirected to a portal page, the gateway device of the present invention determines the authorization and access rights of the user based upon an Authentication, Authorization and Accounting method, as described in U.S. patent application Ser. No. 09/458602 entitled "Systems And Methods For Authorizing, Authenticating And Accounting Users Having Transparent Computer Access To A Network Using A Gateway Device" filed concurrently with this application and incorporated by reference.

According to one aspect of the invention, a user may be identified and authorized access to the network or online services based upon attributes associated with the user, such as the user's location or the user's computer. When this occurs, the user can be forwarded to a portal page unique to that user. As described below, and in the U.S. patent application incorporated by reference immediately above, the user may be identified without being queried to input any identification information so that upon accessing the computer network the user is automatically directed to a generic portal page or a portal page established specifically for and unique to that user. According to another aspect of the invention, a user may be identified and authorized access based upon the user's identity after being redirected to the portal page. The user may have to enter a login name and password while at the portal page or after being directed to a login page so that the ISP or other entity maintaining the gateway device can identify the user. After entering identifying data, the user may be directed to a particular portal page, as in the first aspect described above. According to a third aspect of the invention, the user is not authorized access to the network. Where this occurs the user will be directed from the portal page to a login page where the user will have to input identification information, such as the user's name, address, credit card number, and other relevant data so that the user may be authorized to access the network. After the user enters sufficient login data to establish authorization, the user may be redirected to a portal page.

The redirection is accomplished by a Home Page Redirect (HPR) performed by the gateway device, a AAA server, or by a portal page redirect unit located internal to or external to the gateway device. To accomplish the redirection of a user to a portal page, HPR utilizes a Stack Address Translation (SAT) operation to direct the user to the portal page, which is preferably local to the gateway device so that the redirection will be efficient and fast. This is accomplished by redirecting the user to a protocol stack using network and port address translation to the portal server that can be internal to the computer network or gateway device. More specifically, the gateway device, AAA server or portal page redirect unit receives the user's HTTP request for a web page and sends back the HTTP response reversing the network and port address translation the portal server, essentially acting as a transparent 'go-between' to the user and portal server. It will be appreciated, however, that to receive the HTTP request the gateway device, AAA server or portal page redirect unit must initially open a Transmission Control Protocol (TCP) connection to a server in line with the user-requested internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or 'handshake'. Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's internet browser, the gateway device can forward the communication transparently to the user's requested destination without requiring the user to access the portal page. Furthermore, according to one aspect of the invention specific user-input destination addresses may be authorized to pass through the gateway device without being redirected.

The portal page can also be specialized based on the user, user's location, user's computer, or any combination thereof For example, assuming that the user has been authenticated and has authorization, the gateway device can present users with a portal page that identifies, among other things, the online services or other computer networks that are accessible via the gateway device. In addition, the portal page presented by the gateway device can provide information regarding the current parameters or settings that will govern the access provided to the particular user. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the user a higher rate for their service. For example, a user may elect to increase the transfer rate at which signals are transmitted across the computer network and pay a correspondingly higher price for the expedited service.

The portal page may include advertising tailored to the specific needs of the user. The gateway device would be capable of tailoring the material based upon user profiles in the network. The portal page may also incorporate surveys or links to surveys to provide the network provider with beneficial statistical data. As an ancillary benefit, the user who responds to the surveys may be rewarded with network access credit or upgraded quality. Additionally, the service provided could offer additional services to the user by way of the portal page or links to these services may be offered on the portal page. These services offered by the network service provider are not limited to the services related to the network connection. For example, a hotel may desire to offer the user in-room food service or a multi-unit dwelling may want to offer house cleaning service.

The portal page may also comprise information related to the status of the current network session. By way of example this information may include, current billing structure data, the category/level of service that the user has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user in a multitude of combinations as defined by the user and/or the gateway administrator. The gateway administrator will have the capability to dynamically change the information supplied in the portal page based on many factors, including the location of the user, the profile of the user and the chosen billing scheme and service level. The information provided in the portal page may prompt the user to adjust any number of specific parameters, such as the billing scheme, the routing, the level of service and/or other user-related parameters.

The portal page may be implemented with an object-oriented programming language such as Java developed by Sun Microsystems, Incorporated of Mountain View, Calif. The code that defines the portal page can be embodied within the gateway device, while the display monitor and the driver are located with the host computers that are in communication with the gateway device. The object oriented programming language that is used should be capable of creating executable content (i.e. self-running applications) that can be easily distributed through networking environments. The object oriented programming language should be capable of creating special programs, typically referred to as applets that can be incorporated in portal pages to make them interactive. In this invention the applets take the form of the portal pages. It should be noted that the chosen object-oriented programming language would require that a compatible web browser be implemented to interpret and run the portal page. It is also possible to implement the portal page using other programming languages, such as HTML, SGML and XML; however, these languages may not be able to provide all the dynamic capabilities that languages, such as Java provide.

By re-directing the user to the portal page the gateway administrator or network operator is provided the opportunity to present the user with updated information pertaining to the remote location (i.e. the hotel, the airport etc.). By way of example the portal page may provide for links to the corporate home page, a travel site on the Internet, an Internet search engine and a network provider home page. Additionally, the buttons or any other field within the portal page may include other types of information options, such as advertising fields or user-specific links or fields based upon data found in the user's profile or inputted by the user.

It will be appreciated that the portal page is not limited to supplying information related to the user's billing and service plans. It is also possible to configure the portal page to include information that is customized to the user or the location/site from which the user is remotely located. For example, the user may be located at a hotel for the purpose of attending a specific convention or conference either in the hotel or within the immediate vicinity of the hotel. The gateway device may have "learned" this information about the user through an initial log-on profile inquiry or the gateway administer may have inputted this information into a database.

The gateway device can store user profile information within a user-specific AAA database, as described below, or it can store and retrieve data from external databases. The gateway device can be configured to recognize these profiles and to customize the portal page accordingly. In the hotel scenario, the portal page may include a link for convention or conference services offered by the hotel.

In another example of location specific portal page data, the user may be remotely accessing the gateway device while located in a specific airport terminal. The gateway device will be configured so that it is capable of providing ready access to information related to that specific airport terminal, i.e. information pertaining to the current flights scheduled to depart and arrive that terminal, the retail services offered in that specific terminal, etc. In this manner, the portal page may include a link for terminal specific flight information and/or terminal specific retail services available to the user.

It will also be appreciated that the HPR may be configured so a user is redirected to a portal page upon specific default occurrences, such as a time out, or according to preset time. For example, the portal page may act as a screen-saver, where the user is redirected to a portal page after a given period of inactivity. These functions may be established by the ISP or enterprise network administrator.

Customization of the information comprising the portal page is not limited to the gateway administrator or the network operator. The user may also be able to customize the information that is provided in the portal page. The user customization may be accomplished either directly by the user configuring the portal page manually or indirectly from the gateway device configuring the portal page in response to data found in the user-specific profile. In the manual embodiment the user may be asked to choose which information or type of information they would like supplied in the portal page for that specific network session. For instance, the user may require an alarm clock counter to insure an appointment is met or the user may require periodical updates of a specific stock quote. The information that a user customizes for the portal page may be network session specific, may be associated with the duration of a gateway subscription or may be stored in a user profile for an indefinite period of time. The gateway device's ability to communicate with numerous user databases provides the basis for storing user specific profiles for extended periods of time.

As explained above, the portal page presented to the user can be dependent upon an attribute associated with the user, such as the user's identification, the user's location, an address associated with the user's computer, or a combination thereof The means in which a user is identified and access rights are determined is based upon an Authentication, Authorization and Accounting (AAA) method implemented by the AAA server, and disclosed in U.S. patent application Ser. No. 09/458,602, and filed concurrently with this application.

One function of the AAA server is to identify the user in communication with the gateway device in a manner that is transparent to the user. That is, the user will not be required to reconfigure the computer or otherwise change the home network settings, and no additional configuration software will have to be added to the computer. According to one embodiment of the present invention, after a user is directed to a portal page, the AAA server can be accessed to authorize and authenticate the user. Therefore, upon accessing the network, the user may be forwarded to a generic portal page, and after the user may be authenticated, the user can be forwarded via HPR and SAT to a specialized portal page, as described above.

After receiving a request for access from a user, forwarding the user to a portal page, and identifying the user or location the AAA server then determines the access rights of the particular user. In addition to storing whether users have valid access rights, the user profile database can also include specialized access information particular to a specific location or user, such as the bandwidth of the user's access, or a portal page to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room.

Assuming that a user does not have a subscription for access to the network, a login page enables new users to subscribe to the computer network so that they may subsequently obtain access to networks or online services transparently through the gateway device. The user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user is redirected from the portal page via HPR and SAT to a location, such as a login page, established to validate new users. SAT and HPR can intervene to direct the user to a webserver (external or internal) where the user has to login and identify themselves. Location-based information and authorization, as described in detail in U.S. patent application Ser. No. 60/161,093, incorporated herein by reference, can be sent to the portal page as part of this redirection process. This enables the portal page to be customized to include customized information, such as locale restaurant ads or train schedules.

Assuming that a user has not been authorized access to the network based upon location based identification or user input identification, the user must provide the gateway device with sufficient information to become authorized access. Where the user is not authorized access the user is forwarded via HPR and SAT from the portal page to a login page. The login page enables new users to subscribe to the computer network so that they may subsequently obtain access to networks or online services transparently through the gateway device. To direct the users to a login page the AAA server calls upon the HPR function. The HPR directs the user to the login page, and after the user has entered requisite information into the login page, the AAA server adds the new information to the customer profile database and can direct the user to the user's desired destination, such as an Internet address or can return the user to a portal page, depending upon the design of the system. Thus, new users can gain access to networks or online services without being predefined in the user profile database.

After receiving the user's login information, the AAA server will create a user profile utilizing this information so that the user will be able to obtain immediate access to the network next time the user logs in without being required to enter login information again. The AAA server can create a profile for the user in a locally stored user profile database, or can update the user profile in a database external to the gateway device. Regardless of the location of the user profile, the next time the user attempts to login the user's profile will be located in the user profile database, the user's access rights determined, and the user allowed transparent access to networks or services.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for redirecting an original destination address access request to a redirected destination address, the method comprising the steps of:

receiving, at a gateway device, all original destination address access requests originating from a computer;

determining, at the gateway device, which of the original destination address requests require redirection;

storing the original destination address if redirection is required;

modifying, at the gateway device, the original destination address access request and communicating the modified request to a redirection server if redirection is required;

responding, at the redirection server, to the modified request with a browser redirect message that reassigns the modified request to an administrator-specified, redirected destination address;

intercepting, at the gateway device, the browser redirect message and modifying it with the stored original destination address; and sending the modified browser redirect message to the computer, which automatically redirects the computer to the redirected destination address.

2. The method of claim 1, further comprising the step of directing the computer to the stored original destination address after the computer has been automatically redirected to the redirected destination address.

3. The method of claim 2, wherein the step of directing the computer to the stored original destination address occurs after a predetermined length of time.

4. The method of claim 2, wherein the step of directing the computer to the stored original destination address occurs after a predetermined computer input event has occurred.

5. The method of claim 1, wherein the step of responding, at the redirection server, to the modified request with a browser redirect message that reassigns the modified request to an administrator-specified, redirected destination address further comprises responding, at the redirection server, to the modified request with a browser redirect message that reassigns the modified request to a redirected destination address associated with a login page.

6. A system for redirecting an original destination address access request to a redirected destination address, the system comprising:

a computer that initiates original destination address requests;

a gateway device in communication with the computer, that receives the original destination address requests from the computer, determines if redirection of any of the original destination address requests is required, stores the original destination address request if redirection is required and modifies the original destination address request if redirection is required, and a redirection server in communication with the gateway device that receives the modified request from the gateway device and responds with a browser redirect message that reassigns the request to an administrator-specified, redirect destination address, wherein the gateway device intercepts the browser redirect message and modifies the response with the stored original destination address before forwarding the browser redirect message to the computer and wherein the computer receives the modified browser redirect message and the computer is automatically redirected to the redirect destination address.

7. The system of claim 6, further comprising a user profile database in communication with the gateway device that includes stored user-access information.

8. The system of claim 6, further comprising an Authentication, Authorization and Accounting (AAA) server in communication with the gateway device and user profile database, the AAA server determines if a user of the computer is entitled to access the original destination address requests based upon the user-access information stored within the user profile database.

9. The system of claim 6, wherein the redirection server is located within the gateway device.

10. The system of claim 7, wherein the user-profile database is located within the gateway device.

11. The system of claim 8, wherein the AAA server is located within the gateway device.

* * * * *

US006636894C1

(12) EX PARTE REEXAMINATION CERTIFICATE (5316th)
United States Patent
Short et al.

(10) Number: US 6,636,894 C1
(45) Certificate Issued: Mar. 28, 2006

(54) SYSTEMS AND METHODS FOR REDIRECTING USERS HAVING TRANSPARENT COMPUTER ACCESS TO A NETWORK USING A GATEWAY DEVICE HAVING REDIRECTION CAPABILITY

(75) Inventors: Joel E. Short, Los Angeles, CA (US); Frederic Delley, Redwood City, CA (US); Mark F. Logan, Santa Monica, CA (US); Florence C. I. Pagan, Los Angeles, CA (US)

(73) Assignee: Nomadix, Inc., Westlake Village, CA (US)

Reexamination Request:
No. 90/007,220, Sep. 24, 2004

Reexamination Certificate for:
Patent No.: 6,636,894
Issued: Oct. 21, 2003
Appl. No.: 09/458,569
Filed: Dec. 8, 1999

Related U.S. Application Data
(60) Provisional application No. 60/111,497, filed on Dec. 8, 1998.

(51) Int. Cl.
G06F 15/173 (2006.01)

(52) U.S. Cl. .................. 709/225; 709/249; 709/226
(58) Field of Classification Search ................ 709/217, 709/219, 202, 220, 223, 224, 226, 227, 229, 709/238
See application file for complete search history.

(56) References Cited

U.S. PATENT DOCUMENTS

| | | | |
|---|---|---|---|
| 5,781,550 A | 7/1998 | Templin et al. | |
| 5,802,320 A | 9/1998 | Baehr et al. | |
| 5,948,061 A | 9/1999 | Merriman et al. | |
| 6,014,698 A | 1/2000 | Griffiths | |
| 6,052,725 A * | 4/2000 | McCann et al. ............ | 709/223 |
| 6,098,172 A | 8/2000 | Coss et al. | |
| 6,119,162 A | 9/2000 | Li et al. | |
| 6,226,677 B1 | 5/2001 | Slemmer | |

OTHER PUBLICATIONS

Complaint, Demand for Jury Trial; *IPE Networks, Inc.* vs. *Nomadix, Inc.*; Case No. 04 CV 1485 DMS (POR); 45 pages; Filed Jul. 23, 2004; United States District Court, Southern District of California.

Amended Complaint, Demand for Jury Trial; *IPE Networks, Inc.* vs. *Nomadix, Inc.*; Case No. 04 CV 1485 DMS (POR); 48 pages; Sep. 20, 2004; United States District Court, Southern District of California.

(Continued)

*Primary Examiner*—Jeffrey Pwu

(57) ABSTRACT

Systems and methods for dynamically creating new users having transparent computer access to a destination network, wherein the users otherwise have access to a home network through home network settings resident on the users' computers, and wherein the users can access the destination network without altering the home network settings. The system includes a gateway device for receiving a request from a user for access to the destination network, a user profile database comprising stored access information and in communication with the gateway device, and an Authentication, Authorization and Accounting (AAA) server in communication with the gateway device and user profile database. The AAA server determines if user is entitled to access the destination network based upon the access information stored within the user profile database, and wherein the AAA server redirects the user to a login page where the access information does not indicate the user's right to access the destination network. The systems and methods of the present invention can also redirect users having transparent computer access to a destination network, wherein the users otherwise have access to a home network through home network settings resident on the users' computers, and wherein the users can access the destination network without altering the home network settings.

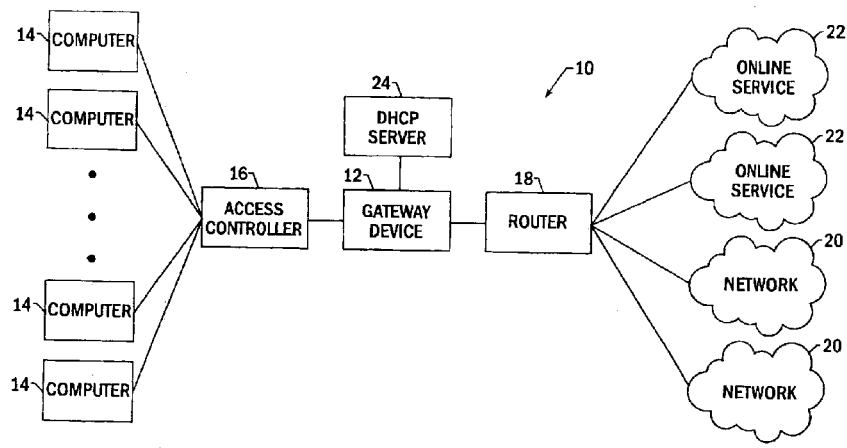

OTHER PUBLICATIONS

Answer and Counterclaims of Nomadix Inc. to the Amended Complaint; *IPE Networks, Inc. vs. Nomadix, Inc.*; Case No. 04 CV 1485 DMS (POR); 44 pages; Filed Oct. 21, 2004; United States District Court, Southern District of California.

Plaintiff/Counter–Defendant IPE Networks Inc.'s Reply to Defendant Nomadix, Inc.'s Counterclaim; *IPE Networks, Inc. vs. Nomadix, Inc.*; Case No. 04 CV 1485 DMS (POR); 8 pages; Nov. 15, 2004; United States District Court, Southern District of California.

David C. Plummer; *An Ethernet Address Resolution Protocol or Converting Network Protocol Addresses to 48.bit Ethernet Address for Transmission on Ethernet Hardware*; Nov. 1982; 8 pages; Network Working Group, Request for Comments 826.

Charles Hornig; *A Standard for the Transmission of IP Datagrams over Ethernet Networks*; Apr. 1984; 3 pages; Network Working Group, Request for Comments 894.

J. Postel; *Multi–Lan Address Resolution;* Oct. 1984; 14 pages; Network Working Group, Request for Comments 925.

R. Braden, J. Postel; *Requirements for Internet Gateways;* Jun. 1987; 50 pages; Network Working Group, Request for Comments 1009.

Smoot Carl–Mitchell, John S. Quarterman; *Using ARP to Implement Transparent Subnet Gateways*; Oct. 1987; 8 pages; Network Working Group, Request for Comments 1027.

P. Mockapetris; *Domain Names—Concepts and Facilities;* Nov. 1987; 49 pages; Network Working Group, Request for Comments 1034.

R. Droms; *Dynamic Host Configuration Protocol;* Oct. 1993; 35 pages; Network Working Group, Request for Comments 1531.

K. Egevang, P. Francis; *The IP Network Address Translator (NAT)*; May 1994; 9 pages; Network Working Group, Request for Comments 1631.

M. Chatel; *Classical Versus Transparent IP Proxies;* Mar. 1996; 32 pages; Network Working Group, Request for Comments 1919.

T. Berners–Lee, F. Fielding, H. Frystyk; *Hypertext Transfer Protocol—HTTP/1.0;* May 1996; 54 pages; Network Working Group, Request for Comments 1945.

Ari Loutonen, Kevin Altis; *World–Wide Web Proxies;* Apr. 1994; 8 pages.

John N. Stewart; *Working with Proxy Servers;* Mar. 1997; pp. 19–22; *WebServer Magazine*.

D. Wessels; *Squid Proxy Server Configuration File 1.93.2.2, "TAG deny_info";* Mar. 1997; 19 pages; available at <http://www.squid–cache.org/mail–archieve/squid–users/199703/att–0250/squid.conf>; (visited Feb. 1, 2005).

Cord Beerman; *Re: Support for cern like Pass/Fair proxy limits?;* 2 pages; available at <http://www.squid–cache.org/mail–archieve/squid–users/199611/0385.html> (visited Feb. 1, 2005).

Information Sciences Institute; *Internet Protocol, DARPA Internet Program, Protocol Specification;* Sep. 1981; 45 pages; available at <http://www.faqs.org/rfcs/rfc791.html> (visited 0002–01–2005).

Doug MacEachern; *Apache/Perl Integration Project;* README; 2 pages; available at <http://apache.perl.org>, <http://outside.organic.com/mail–archives/modperl>, and <http://www.ping.de/~fdc/mod_perl>.

Gisle Aas, Doug MacEachern; *Apache.pm;* 18 pages; available at <http://www.apache.org/docs>.

*Mod_perl.c;* Copyright; 1995–1997 The Apache Group; 20 pages.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *